(12) United States Patent
Wates et al.

(10) Patent No.: US 8,980,818 B2
(45) Date of Patent: Mar. 17, 2015

(54) LOW STREAK DEGREASING COMPOSITION

(75) Inventors: Julia Mary Wates, White Plains, NY (US); Maurice O. Dery, Putnam Valley, NY (US); Alberto Slikta, Chicago, IL (US); Boen Ho O, Utrecht (NL)

(73) Assignee: Akzo Nobel Chemicals International B.V., Amersfoort (NL)

(*) Notice: Subject to any disclaimer, the term of this patent is extended or adjusted under 35 U.S.C. 154(b) by 0 days.

(21) Appl. No.: 13/995,005

(22) PCT Filed: Dec. 13, 2011

(86) PCT No.: PCT/EP2011/072501
§ 371 (c)(1),
(2), (4) Date: Jun. 17, 2013

(87) PCT Pub. No.: WO2012/080197
PCT Pub. Date: Jun. 21, 2012

(65) Prior Publication Data
US 2013/0267453 A1 Oct. 10, 2013

Related U.S. Application Data

(60) Provisional application No. 61/423,808, filed on Dec. 16, 2010.

(51) Int. Cl.
*C11D 1/72* (2006.01)
*C11D 1/722* (2006.01)
(Continued)

(52) U.S. Cl.
CPC ............... *C11D 3/124* (2013.01); *C11D 1/825* (2013.01); *C11D 1/835* (2013.01); *C11D 1/94* (2013.01);
(Continued)

(58) Field of Classification Search
CPC .......... C11D 1/72; C11D 1/722; C11D 1/825; C11D 3/08; C11D 3/124; C11D 3/22
USPC .......................... 510/227, 421, 466, 470, 474
See application file for complete search history.

(56) References Cited

U.S. PATENT DOCUMENTS

| 2,630,410 A | 3/1953 | Clapsadle et al. |
| 4,400,288 A | 8/1983 | Dhanani et al. |

(Continued)

FOREIGN PATENT DOCUMENTS

| EP | 0 091 802 B1 | 9/1987 |
| EP | 1 010 421 A1 | 6/2000 |

(Continued)

OTHER PUBLICATIONS

International Search Report and Written Opinion of corresponding Application No. PT/EP/2011/072501, mailed Mar. 29, 2012.

(Continued)

*Primary Examiner* — Brian P Mruk
(74) *Attorney, Agent, or Firm* — Matthew D. Kellam

(57) ABSTRACT

The present invention relates to an aqueous composition comprising three components. The first component is a primary detergent, non-ionic surfactant with a critical packing parameters (CPP) of ≥0.95. The second component is a inorganic particle whose surface has been modified to improve stability. The third necessary component is a secondary surfactant with a CPP of ≤0.85. The secondary surfactant can function to improve the overall cleaning performance, the streaking performance and provide overall formulation stability.

12 Claims, 4 Drawing Sheets

A "streak" on a surface.

(51) Int. Cl.

| | | |
|---|---|---|
| *C11D 1/825* | (2006.01) | |
| *C11D 3/08* | (2006.01) | |
| *C11D 3/22* | (2006.01) | |
| *C11D 3/12* | (2006.01) | |
| *C11D 1/835* | (2006.01) | |
| *C11D 1/94* | (2006.01) | |
| *C11D 11/00* | (2006.01) | |
| *C11D 17/06* | (2006.01) | |
| *B82Y 30/00* | (2011.01) | |
| *C11D 1/62* | (2006.01) | |
| *C11D 1/66* | (2006.01) | |
| *C11D 1/75* | (2006.01) | |
| *C11D 1/88* | (2006.01) | |

(52) U.S. Cl.
CPC ........ *C11D 3/1246* (2013.01); *C11D 11/0035* (2013.01); *C11D 11/0052* (2013.01); *C11D 17/06* (2013.01); *B82Y 30/00* (2013.01); *C11D 1/62* (2013.01); *C11D 1/662* (2013.01); *C11D 1/72* (2013.01); *C11D 1/722* (2013.01); *C11D 1/75* (2013.01); *C11D 1/88* (2013.01)
USPC ........... 510/466; 510/227; 510/421; 510/470; 510/474

(56) References Cited

U.S. PATENT DOCUMENTS

| | | |
|---|---|---|
| 4,927,749 A | 5/1990 | Dorn |
| 5,368,833 A | 11/1994 | Johansson et al. |
| 6,784,149 B2 | 8/2004 | Bauer et al. |
| 7,082,951 B2 | 8/2006 | Barnabas et al. |
| 2002/0111287 A1* | 8/2002 | Bauer et al. ............ 510/445 |
| 2004/0023834 A1 | 2/2004 | Inoue et al. |
| 2005/0239674 A1 | 10/2005 | Dreja et al. |
| 2006/0009370 A1 | 1/2006 | Zuechner et al. |
| 2009/0007936 A1* | 1/2009 | Uhl et al. ............ 134/6 |

FOREIGN PATENT DOCUMENTS

| | | | |
|---|---|---|---|
| EP | 1010421 | * 6/2000 | ............ A61K 7/50 |
| EP | 1216276 A1 | 6/2002 | |
| EP | 1280878 B1 | 8/2007 | |
| JP | S57-115499 A | 7/1982 | |
| JP | H09-202896 A | 8/1997 | |
| JP | 2002-285194 A | 10/2002 | |
| JP | 2005-035990 A | 2/2005 | |
| JP | 2008-222823 A | 9/2008 | |
| JP | 2009-534475 A | 9/2009 | |
| WO | 98/11195 A1 | 3/1998 | |
| WO | WO03/062365 A2 | 7/2003 | |
| WO | WO2004/055145 A1 | 7/2004 | |
| WO | WO2006/097961 A1 | 10/2006 | |
| WO | WO2006/117642 A1 | 11/2006 | |
| WO | 2007/109327 A2 | 9/2007 | |
| WO | WO 2007/109327 | * 9/2007 | |
| WO | WO2008/167754 A2 | 12/2008 | |
| WO | 2010/073752 A1 | 7/2010 | |

OTHER PUBLICATIONS

Iler, Ralph K., "The Chemistry of Silica", John Wiley, 1979, pp. 407-409.

R.K. Iler et al, "Degree of Hydration of Particles of Colloidal Silica in Aqueous Solution", J. Physical Chemistry, vol. 60 (1956), pp. 955-957.

* cited by examiner

Figure 1: A "streak" on a surface.
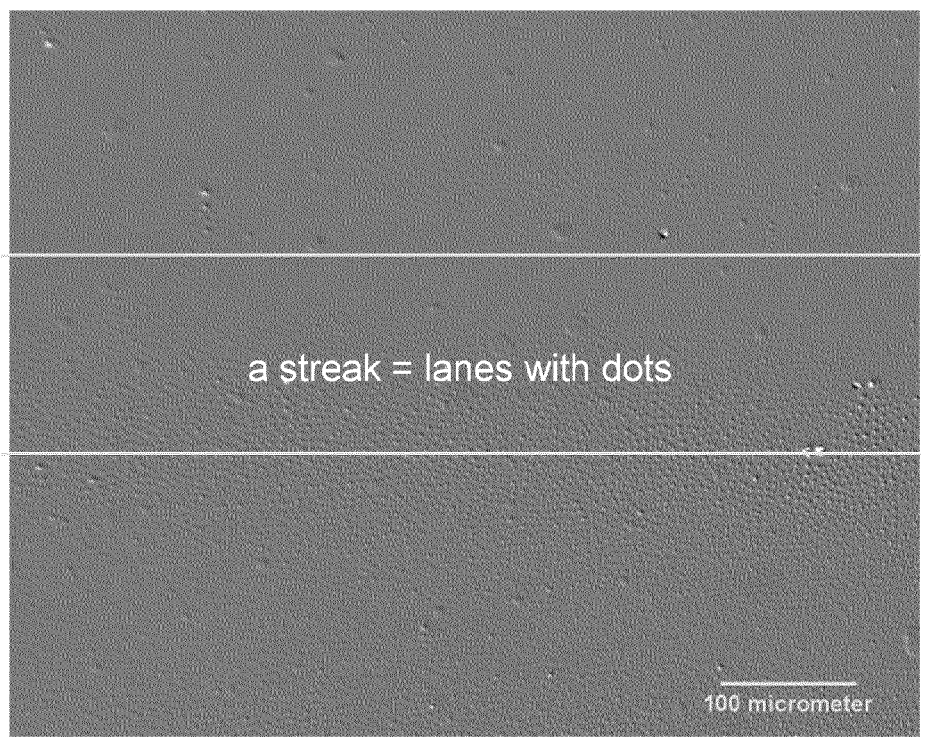

Figure 2. A streak at higher magnification
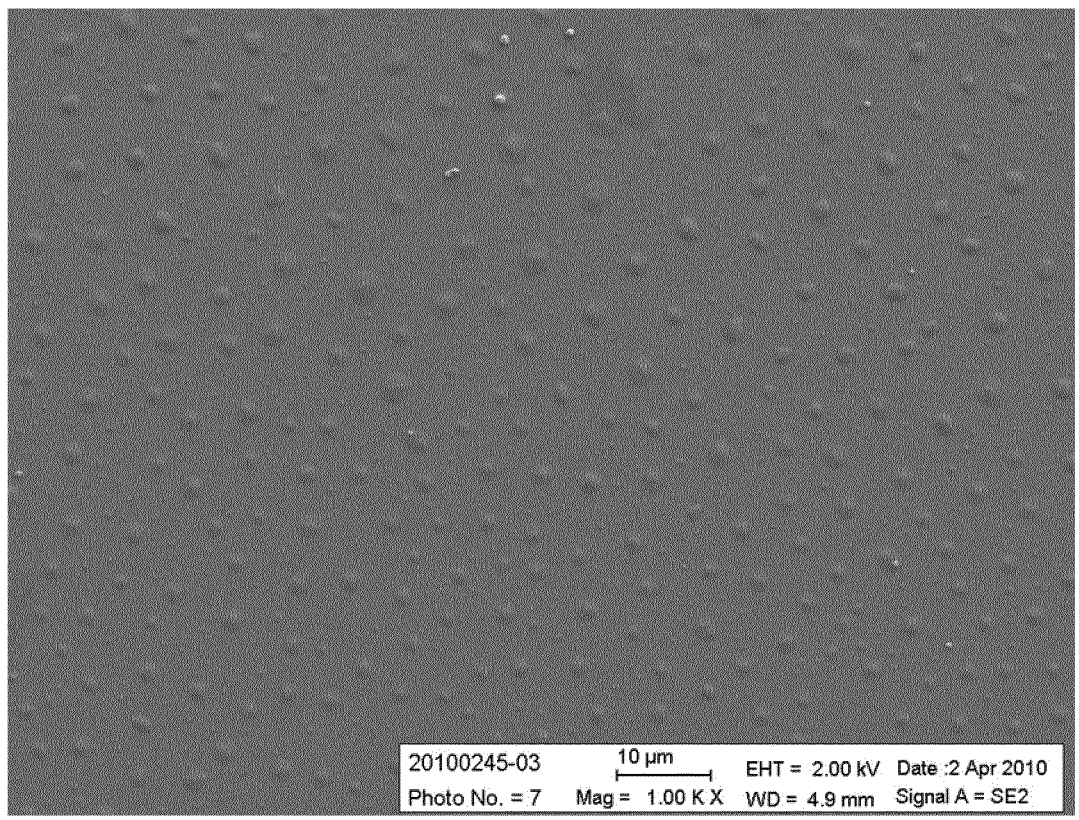

Figure 3: Streak free surface treated with the composition of the present invention.
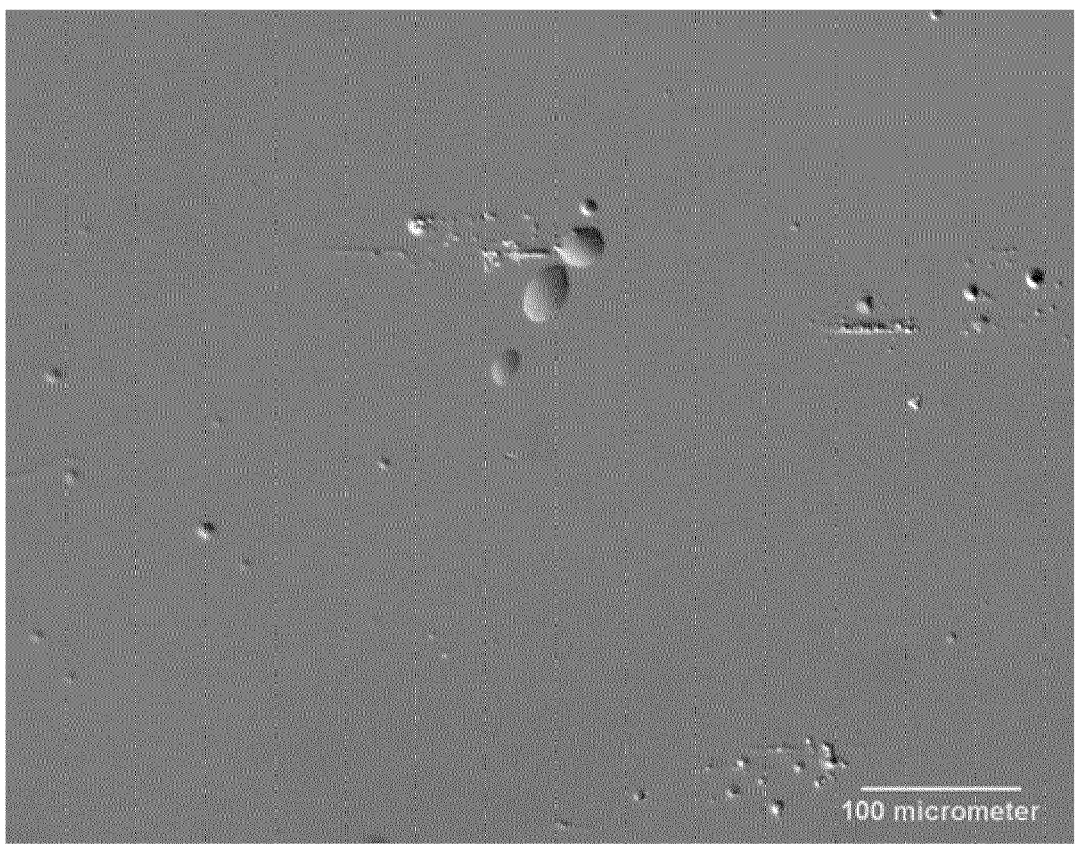

Figure 4: Streak free surface treated with the composition of the present invention at higher magnification.
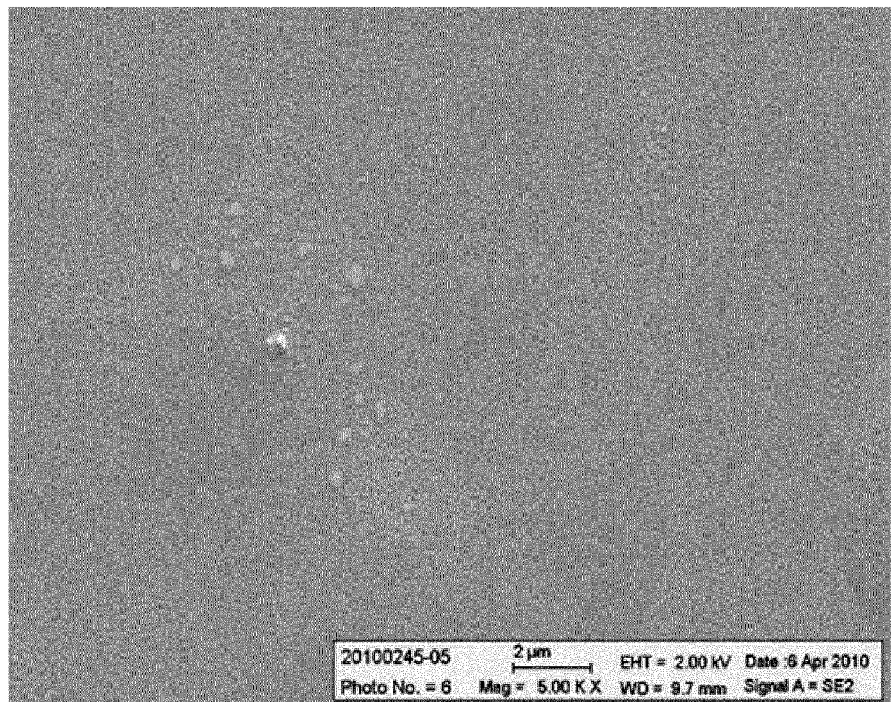

LOW STREAK DEGREASING COMPOSITION

This application is a National Stage entry of International Application PCT/EP2011/072501, filed Dec. 13, 2011, which claims the benefit of U.S. Patent Application No. 61/423,808, filed Dec. 16, 2010. The contents of the aforementioned applications are incorporated herein by reference in their entireties.

FIELD OF INVENTION

The present invention relates to an aqueous composition comprising three components. The first component is a primary detergent, non-ionic surfactant with certain critical packing parameters (CPP). The primary function of the first component is to provide good cleaning performance. The second component is a inorganic particle whose surface has been modified to improve stability. The third necessary component is a secondary surfactant with a certain CPP that can function to improve the overall cleaning performance, the streaking performance and provide overall formulation stability. Methods for manufacturing such compositions and the use of such compositions for cleaning of hard surfaces are provided.

BACKGROUND OF THE INVENTION

Surfactant compositions are currently being used in many cleaning applications, including cleaning of hard surfaces and soft surfaces, e.g. textile, and many other applications in household and industrial use. As used herein, the term "hard surface" refers in particular to hard surfaces encountered in the home, such as surfaces of stone, ceramics, wood, plastics, metals, glass and any lacquered or painted such hard surface.

In hard surface cleaning, there is a desire to provide a surfactant composition which exhibits good degreasing performance and at the same time leaves the surface visually clean of spots, streaks and residue. A typical window cleaner usually leaves the surface free of visual imperfections; however the cleaning performance of most windows cleaners is very poor on heavy soils and greases. On the other hand, many formulations are available for effectively cleaning greases and heavy soils from surfaces.

The use of nano-particles in cleaning formulations is well known. The addition of the nano particle to the formulation has been claimed to provide surface modification benefits like hydrophilization, soil repelling and anti resoiling properties. However, the use of nanosilicas in combination with two additional surfactants to provide excellent degreasing and as well as low streaking is new and cannot be anticipated from the prior art.

Streaking is a visible residue left after the cleaning process. It is believed that streaking may be attributed to formation of an ordered structure that is big enough to be seen by the naked eye. In theory the residue could come from residual dirt not completely removed during the cleaning process. It is often caused by an improperly formulated cleaning composition such that as the cleaning composition dries it forms a visible "residue" of the components.

Without wishing to be bound by theory it is believed that the mechanism of cleaning is critical to the formation of a visible residue. There are two main types of cleaning mechanisms. One is solvency, where the dirt is dissolved from the surface by a formulation that contains high levels of solvents. For example, according to U.S. Pat. No. 7,314,852 column 1, line 29, "the commercially available glass cleaning products sold under the Glass Plus® trademark have a organic solvent system comprising a mixture of ethylene glycol monobutylether (EGBE) and isopropyl alcohol". In this type of formulation is it impossible to obtain a surface that is totally clean. When cleaning with solvents, especially high soil loading conditions, it is difficult to get a streak free surface. These types of formulations work best when the surface is already clean or has very low soil content.

The other mechanism for cleaning surfaces is emulsification of the soil with surfactants. By this mechanism the dirt is removed from the soil by a roll up method. Compared to cleaning with solvents where the soil is dissolved, the soil is emulsified into the surfactant phase and essentially prevented from depositing back down on the surface. Cleaning by roll up results in a much cleaner surface with less residue, some people refer to this as being "squeaky clean".

Surface analysis of a hard surface that has been cleaned using a traditional type cleaning formulation was performed. In this case there was considerable amount of filming and streaking that is visible to the eye. Without wishing to be bound by theory, it appears that formulations that form structured systems, such as a lamellar phase on drying are more susceptible to leaving a visible residue compared to systems that form less structured systems on drying. FIG. 1 shows a surface that has a visible streak. The streak is indicated as a lane with "dots" on it.

FIG. 2 shows the same area but under higher magnification. As evident on examination of FIG. 2, the streak is composed of multiple bumps, blisters and imperfections that happen as a result of the cleaning solution as it dries. So the ability to produce a cleaning solution that after drying does not have any visible residue is critical to controlling the perception of streaking.

Accordingly, it is evident that there is still a need in the art for surfactant compositions that both have high detergency and exhibit a low streaking and low filming behaviour.

An object of the present is to at least partly overcome the drawbacks of the prior art and to provide a surfactant composition which, when used in hard surface cleaning, exhibits good degreasing performance and a low streaking behaviour. The present inventors have surprisingly found that this object is met by an aqueous composition according to the appended claims.

SUMMARY OF THE INVENTION

The present invention relates to an aqueous composition comprising three essential components. The first component being a primary detergent, non-ionic surfactant with a critical packing parameter of ≥0.95. The second component being an inorganic particle whose surface has been modified to improve stability. The third component is a secondary surfactant with a critical packing parameter of ≤0.85.

In a second aspect, the present invention relates to a method for cleaning hard surfaces utilizing the aforementioned composition.

DESCRIPTION OF THE FIGURES

FIG. 1 is a high magnification view of a surface with streaks.

FIG. 2, is a hard surface treated with a typical hard surface cleaner demonstrating visible "blisters", bumps or imperfections associated with streaking.

FIG. 3 is a surface treated with the composition of the present invention; the imperfections observed in the photograph of FIG. 3 are attributed to the surface itself and not the formulated cleaning solution.

FIG. 4 shows the same area as FIG. 3 but at higher magnification.

DETAILED DESCRIPTION OF THE INVENTION

The present invention relates to an aqueous composition comprising three components. The first component is a primary detergent, non-ionic surfactant with a critical packing parameters (CPP) of ≥0.95. The second component is a inorganic particle whose surface has been modified to improve stability. The third necessary component is a secondary surfactant with a CPP of ≤0.85. The secondary surfactant can function to improve the overall cleaning performance, the streaking performance and provide overall formulation stability.

The composition of the invention can be formulated into an excellent cleaning composition that leaves no streaks on the surface. Without wishing to be bound by theory it is believed that the dried composition does not result in visible "blisters", bumps or imperfections as observed in FIG. 2, which is treated with a typical hard surface cleaner. A picture of a surface treated with the composition of the present invention is given in FIG. 3. The imperfections observed in the photograph of FIG. 3 are attributed to the surface itself and not the formulated cleaning solution. FIG. 4 shows the same area as FIG. 3 but at higher magnification. The advantage of the invention can be clearly seen by comparing FIG. 4 (low streak) to FIG. 2 (typical hard surface cleaner). FIG. 2 and FIG. 4 are presented at similar magnification but for FIG. 2 it is slightly less. Evident on comparison of these two images is the lack of larger "blisters" on the surface treated with the low streak cleaning formulation.

Primary Detergent Nonionic Surfactant

The primary detergent non-ionic surfactant is selected from the group of alkoxylates, propoxylates, butoxylates and mixed ethoxylates and propoxylates and butoxylates prepared from hydrophobic alcohols. The hydrophobic alcohols can be linear or branched and have between 8 and 18 carbon atoms. The hydrophobic alcohols may contain unsaturated portions and can be derived from natural, mineral and synthetic sources.

The primary detergent non-ionic surfactants contemplated for use in the present application are those having a critical packing parameter (CPP) of ≥0.95.

Alcohol Alkoxylates

The nonionic surfactant is preferably an alkoxylate surfactant having the formula

$$R_1O\text{-}(AO)_n \quad (1)$$

where $R_1$ is linear or branched, saturated or unsaturated hydrocarbyl group, in one embodiment an alkyl group, containing from 8 to 18, in another embodiment 8 to 14, and in still another embodiment 8-12, and in yet another embodiment 9 to 12 carbon atoms.

AO is an alkyleneoxy group, in one embodiment an ethyleneoxy, propyleneoxy or butyleneoxy group, or a mixture of two or more thereof in any order, and n is a real number from 1 to 25, in another embodiment from 1 to 20, in still another embodiment from 2 to 12, and in yet another embodiment from 2 to 10.

Thus, the alkoxylate surfactant may, in addition to the 1-20 ethyleneoxy units, also contain up to 5 propyleneoxy units. The number of propyleneoxy units, when present, may be as small as 0.1 mole PO per mole alcohol. The ethyleneoxy units and the propyleneoxy units could be added randomly or in blocks. The blocks could be added to the alcohol in any order. The alkoxylates may also contain an alkyl group with 1-4 carbon atoms in the end position. In one embodiment, the alkoxylates contains 2-8 ethyleneoxy units and 0-2 propyleneoxy units.

Linear nonionic surfactants contemplated for use in the present invention include, but are not limited to, $C_9$-$C_{11}$ alcohol+4, 5 or 6 moles of EO, $C_{8-10}$ alcohol+4,5, or 6 moles of EO, $C_{11}$ alcohol+3, 4, 5, 6, 7 or 8 moles of EO and tridecyl alcohol+4, 5, 6, 7 or 8 moles of EO. Branched nonionic surfactants contemplated for use in the present invention include, but are not limited to, 2-ethylhexanol+3, 4 or 5 moles of EO, 2-ethylhexanol+2 moles of PO+4, 5 or 6 moles of EO, 2-propylheptanol+3, 4, 5 or 6 moles of EO and 2-propylheptanol+1 mole of PO+4 moles of EO. Another example is 2-butyloctanol+5, 6 or 7 moles of EO. Wherever the degree of alkoxylation, such as ethoxylation and/or propoxylation is discussed, the numbers referred to are molar average numbers.

In one embodiment, the final formulation containing builders and optional ingredients is clear.

Inorganic Based Nanoparticles

As used herein, the term "inorganic based "nanoparticle" refers to a particle that in no dimension has a size exceeding about 500 nm, and that is formed from an optionally surface modified inorganic material, the optional surface modification possibly comprising an organic material.

The inorganic based nanoparticles suitable for use in the present invention preferably are those able to form a stable dispersion in a composition of the present invention. By the term "stable", particularly in the context of a "stable dispersion" is meant a stable compound, mixture or dispersion that does not substantially gel or precipitate within a period of preferably at least about 2 months, more preferably at least about 4 months, and most preferably at least about 5 months at normal storage in room temperature, i.e. at a temperature from about 15 to about 35° C.

In one embodiment, the inorganic based nano particles are colloidal silica particles. Colloidal silica particles, also referred to as silica sols herein, may be derived from e.g. precipitated silica, micro silica (silica fume), pyrogenic silica (fumed silica) or silica gels with sufficient purity, and mixtures thereof.

Colloidal silica particles and silica sols according to the invention may be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3 wt %, in another embodiment from about 0.1 to about 2 wt %. The procedure of preparing an aluminium modified silica sol is further described in e.g. "The Chemistry of Silica", by Iler, K. Ralph, pages 407-409, John Wley & Sons (1979) and in U.S. Pat. No. 5,368,833.

The colloidal silica particles suitably have an average particle diameter ranging from about 2 to about 150 nm, in another embodiment from about 3 to about 50 nm, and in still another embodiment from about 5 to about 40 nm. Suitably, the colloidal silica particles have a specific surface area from about 20 to about 1500, in another embodiment from about 50 to about 900, and in still another embodiment from about 70 to about 600 m²/g.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The colloidal silica particles are suitably dispersed in an aqueous solvent, suitably in the presence of stabilizing cations such as $K^+$, $Na^+$, $Li^+$, $NH_4^+$, organic cations, primary, secondary, tertiary, and quaternary amines, or mixtures thereof so as to form an aqueous silica sol. However, also dispersions comprising organic solvents, e.g. lower alcohols, acetone or mixtures thereof may be used, suitably in an amount of from about 1 to about 20, in another embodiment from about 1 to about 10, and in yet another embodiment from about 1 to about 5 volume percent of the total solvent volume. However, aqueous silica sols without any further solvents are advantageously used, as are colloidal silica particles that are negatively charged.

Suitably, the silica content in the sol is from about 20 to about 80, in another embodiment from about 25 to about 70, and in still another embodiment from about 30 to about 60 wt %. The higher the silica content, the more concentrated the resulting silanized colloidal silica dispersion. The pH of the silica sol suitably is from about 1 to about 13, in another embodiment from about 6 to about 12, and in still another embodiment from about 7.5 to about 11. However, for aluminium-modified silica sols, the pH suitably is from about 1 to about 12, in another embodiment from about 3.5 to about 11.

On one embodiment of the invention, the silica sol has an S-value from about 20 to about 100, in another embodiment from about 30 to about 90, and in yet another embodiment from about 60 to about 90. It has been found that dispersions with an S-value within these ranges can improve the stability of the resulting dispersion. The S-value characterises the extent of aggregation of colloidal silica particles, i.e. the degree of aggregate or microgel formation. The S-value has been measured and calculated according to the formulas given in J. Phys. Chem. 60 (1956), 955-957 by Iler, R. K. & Dalton, R. L.

The S-value depends on the silica content, the viscosity, and the density of the colloidal silica particles. A high S-value indicates a low microgel content. The S-value represents the amount of $SiO_2$ in percent by weight present in the dispersed phase of e.g. a silica sol. The degree of microgel can be controlled during the production process as further described in e.g. U.S. Pat. No. 5,368,833.

In one embodiment, at least part of the inorganic nanoparticles are silanized colloidal silica particles. In such an embodiment, the composition may contain besides silanized colloidal silica particles also, at least to some extent, non-silanized colloidal silica particles depending on the size of the silica particles, weight ratio of silane to silica, type of silane compound, reaction conditions etc. Suitably, at least about 40 wt % of the colloidal silica particles are silanized (silane-modified), in another embodiment at least about 65, in still another embodiment at least about 90, and in yet another embodiment at least about 99 wt %. The composition may comprise besides silane in the form of silane groups or silane derivatives bound or linked to the surface of the silica particles also at least to some extent freely dispersed unbound silane compounds. Suitably, at least about 40, in another embodiment, at least about 60, in still another embodiment at least about 75, in yet another embodiment at least about 90, and in another embodiment at least about 95 wt % of the silane compounds are bound or linked to the surface of the silica particles.

Suitably, at least about 1% by number of the silanol surface groups on the colloidal silica particles are capable of binding or linking to silane groups on the silane compounds, in another embodiment at least about 5%, in a second embodiment at least about 10%, in a third embodiment at least about 30%, and in a fourth embodiment at least about 50% bind or link to a silane group.

The weight ratio of the total silane content to the total silica content in the composition is from about 0.01 to about 1.5, in a second embodiment from about 0.05 to about 1, and in a third embodiment from about 0.1 to about 0.5. The total content of silica comprises silica in modified silanized silica particles and non-modified silica particles which also may be present. The total content of silane is based on all freely dispersed silane and all linked or bound silane groups or derivatives.

Colloidal silanized silica particles available as Bindzil CC30 and CC301 are available from Eka Chemicals, Sweden.

Silanization of colloidal silica particles is described in detail in WO 2005/097961 A1, incorporated herein by reference. According to one embodiment, the silanized colloidal silica particles have no silicone coat. Suitable silane compounds for silanization of colloidal silica particles include tris-(trimethoxy)silane, octyl triethoxysilane, methyl triethoxysilane, methyl trimethoxysilane; isocyanate silane such as tris-[3-(trimethoxysilyl)propyl]isocyanurate; gamma-mercaptopropyl trimethoxysilane, bis-(3-[triethoxysilyl]propyl)polysulfide, beta-(3,4-epoxycyclohexyl)-ethyl trimethoxysilane; silanes containing an epoxy group (epoxy silane), glycidoxy and/or a glycidoxypropyl group such as gamma-glycidoxypropyl trimethoxysilane, gamma-glycidoxypropyl methyldiethoxysilane, (3-glycidoxypropyl)trimethoxy silane, (3-glycidoxypropyl) hexyltrimethoxy silane, beta-(3,4-epoxycyclohexyl)-ethyltriethoxysilane; silanes containing a vinyl group such as vinyl triethoxysilane, vinyl trimethoxysilane, vinyl tris-(2-methoxyethoxy)silane, vinyl methyldimethoxysilane, vinyl triisopropoxysilane; gamma-methacryloxypropyl trimethoxysilane, gamma-methacryloxypropyl triisopropoxysilane, gamma-methacryloxypropyl triethoxysilane, octyltrimethyloxy silane, ethyltrimethoxy silane, propyltriethoxy silane, phenyltrimethoxy silane, 3-mercaptopropyltriethoxy silane, cyclohexyltrimethoxy silane, cyclohexyltriethoxy silane, dimethyldimethyoxy silane, 3-chloropropyltriethoxy silane, 3-methacryoxypropyltrimethoxy silane, i-butyltriethoxy silane, trimethylethoxy silane, phenyldimethylethoxy silane, hexamethyldisiloxane, trimethylsilyl chloride, vinyltriethoxy silane, hexamethyldisilizane, and mixtures thereof. U.S. Pat. No. 4,927,749 discloses further suitable silanes which may be used in the present invention.

In one embodiment the silanes are epoxy silanes and silane compounds containing a glycidoxy or glycidoxypropyl group, particularly gamma-glycidoxypropyltrimethoxysilane and/or gamma glycidoxypropylmethyldiethoxysilane.

Silica nanoparticles advantageously utilized in the invention are sold under the tradenames Bindzil® CC30 and Bindzil® CC301.

TABLE 1

Listing the properties of the silica sols included in the study

| silica sol | particle size (nm) | surface area (m$^2$/g) | pH | modification | solid content (%) | stability CaCl2 (30%) |
|---|---|---|---|---|---|---|
| Bindzil Cat80 | 42 | 85 | — | cationic | | Fail |
| Bindzil 159/500 | 6.1 | 525 | — | anionic | | Fail |

TABLE 1-continued

Listing the properties of the silica sols included in the study

| silica sol | particle size (nm) | surface area (m²/g) | pH | modification | solid content (%) | stability CaCl2 (30%) |
|---|---|---|---|---|---|---|
| Bindzil 15/500 | 6.1 | 525 | — | Unmodified | 15 | Fail |
| Bindzil 30/360 | 9 | 356 | 10.4 | Unmodified | 30 | Fail |
| Bindzil 30/220 | 14.5 | 220 | 10.0 | Unmodified | 30 | Fail |
| Bindzil 820DI | 8 | 400 | 2.6 | Unmodified | 20 | Fail |
| Bindzil 2034DI | 16 | 200 | — | Unmodified | 34 | Fail |
| Bindzil CC30 | 7.2 | 445 | 7.9 | glycidoxypropyl | 30 | Stable |
| Bindzil CC301 | 7.2 | 445 | 7.9 | glycidoxypropyl | 29 | Stable |

The influence of silica in cleaning formulations was briefly investigated. Solution stability is believed to be important in reducing the streaks. Low streaking requires the silica sol to be moderately to highly stable in the formulation in order to prevent the sol actually contributing to the formation of streaks. Without wishing to be bound by theory it is believed that tolerance to salt levels leads to lower the streak intensity in the final formulation. Bindzil® CC30 and Bindzil® CC301 are the best in resisting salinity at high pH. Since most useful cleaners are formulated under alkaline pH conditions, a variety of commercially sold silica sols were tested for salt tolerance at pH=10.5±0.5. A solution containing 2% of the silica sol was adjusted to pH=10.5 using 10% NaOH solution. A 30% solution of CaCl2 was added. Only two of the silica sols tested under these conditions resulted in a stable formulation. These are the Bindzil® CC30 and Bindzil® CC301. The other silica sols were destabilized with relatively small amounts of the calcium chloride solution. In contrast the silica sols advantageously utilized in the invention were stable at all levels of salt up to 30%.

Secondary Surfactant

The secondary surfactant may be a non-ionic, cationic, amphoteric, zwitterionic or anionic surfactant or a mixture of two or more thereof, preferably a non-ionic, cationic or amphoteric surfactant. The critical aspect for the choice of the secondary surfactant is the CPP. Surfactants and combinations of surfactants that have a CPP≤0.85 are preferred.

In one embodiment, the secondary surfactant is an alkyl (poly)glucoside having the formula $$R^2OG_p$$

where,
$R^2$ is a straight or branched, saturated or unsaturated hydrocarbyl group, in one embodiment an alkyl group containing from 6 to 12, in a second embodiment containing 6 to 10, carbon atoms, and in a third embodiment 6 carbon atoms.
G is a monosaccharide residue, in one embodiment a glucoside;
p is a real number from 1 to 5, in a second embodiment from 1 to 3, in a third embodiment from 1 to 2, and in a fourth embodiment 1.5. A nonionic surfactant advantageously employed is sold under the tradename AG® 6206 by AkzoNobel Surface Chemistry, Chicago, Ill.

The secondary surfactant can also be an amine oxide of the structure $$R\text{—}N^+(R1)(R2)\text{-}O^-$$

R is a alkyl group containing 10-18 carbons and optionally can be R-L-R, where L is an amide or ester linkage. R1 and R1 can be the same or different and are selected from the group consisting of, methyl, ethyl, hydroxyethyl, 2-hydroxy propyl. In one embodiment, the amine oxide secondary surfactant is where R=C12-C14, and R1 and R2 are the same and methyl. In another embodiment R=C12-C14 and R1 and R2 are the same and hydroxyethyl. An amine oxide advantageously employed is sold under the trade name Aromox® C/12 by AkzoNobel Surface Chemistry, Chicago, Ill.

Secondary surfactants can also be cationic surfactants. One class of cationic surfactants is of the formula

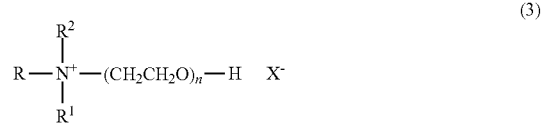

(3)

where R=$C_6$-$C_{22}$ hydrocarbyl, in a second embodiment $C_6$-$C_{22}$ alkyl or alkenyl, in a third embodiment $C_8$-$C_{20}$ alkyl or alkenyl and in a fourth embodiment $C_{10}$-$C_{14}$ alkyl or alkenyl; $R^1$ and $R^2$ are independently $C_1$-$C_4$ alkyl, in one embodiment methyl or ethyl, in a second embodiment both $R^1$ and $R^2$ are methyl; n is at least 12, and at most 25, in another embodiment at most 20 and in another embodiment at most 17; and $X^-$ is an anion, e.g. halide or methylsulfate.

Additional secondary surfactants can have the formula

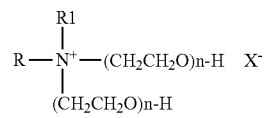

where R=$C_6$-$C_{22}$ hydrocarbyl, in another embodiment $C_6$-$C_{22}$ alkyl or alkenyl, in yet another embodiment $C_8$-$C_{20}$ alkyl or alkenyl and in still another embodiment $C_{10}$-$C_{14}$ alkyl or alkenyl; $R^1$ is independently $C_1$-$C_4$ alkyl, e.g. methyl or ethyl, and in another embodiment methyl; n is at least 12, and at most 25, in another embodiment at most 20 and in still another embodiment at most 17; and $X^-$ is an anion, e.g. halide or methylsulfate. In one aspect, R=C12-14, R1=methyl, n=15 and $X^-$ is an acceptable anion such as chloride.

In another embodiment, the secondary surfactant is an amphoteric secondary surfactant. One class of such surfactants is of the formula

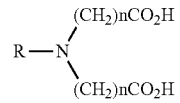

where R=$C_6$-$C_{22}$ hydrocarbyl, preferably $C_6$-$C_{22}$ alkyl or alkenyl linear or branched, more preferably $C_8$-$C_{20}$ alkyl or alkenyl linear or branched and in another embodiment $C_8$ or $C_9$ branched; n is an integer from 1 to 4, in another embodiment 2 to 3, and in another embodiment 2. Amphoteric surfactants advantageously employed are sold under the trade name Ampholak® YJH-40.

In another embodiment, the secondary surfactant is a nonionic $C_{10\text{-}14}$ alcohol with 0-2 PO and 6-10 EO.

In another embodiment the composition of the invention can comprise two or more secondary surfactants selected from the secondary surfactants described above.

In still another embodiment, the composition of the invention contains at least two secondary surfactants, wherein the first secondary surfactant is an alkyl(poly)glucoside having the formula $$R^2OG_p$$

where,
$R^2$ and G are as defined above, and the second secondary surfactant is a nonionic $C_{10-14}$ alcohol with 0-2 PO and 6-10 EO.

Additional Surfactants

When the secondary surfactant is cationic, the composition advantageously comprises an anionic surfactant. Useful anionic surfactants include the water-soluble salts, particularly the alkali metal, ammonium and alkylolammonium (e.g., monoethanolammonium or triethanolammonium) salts, of organic sulfuric reaction products having in their molecular structure an alkyl group containing from about 10 to about 20 carbon atoms and a sulfonic acid or sulfuric acid ester group. (Included in the term "alkyl" is the alkyl portion of aryl groups.) Examples of this group of synthetic surfactants are the alkyl sulfates, especially those obtained by sulfating the higher alcohols (C8-C18 carbon atoms) such as those produced by reducing the glycerides of tallow or coconut oil.

Another class of useful anionic surfactants are water-soluble salts of: paraffin sulfonates containing from about 8 to about 24, in another embodiment, 12 to 18 carbon atoms; alkyl glyceryl ether sulfonates, including but not limited to ethers of C8-18 alcohols (for example, those derived from tallow and coconut oil); alkyl phenol ethylene oxide ether sulfates containing from about 1 to about 4 units of ethylene oxide per molecule and from about 8 to about 12 carbon atoms in the alkyl group; and alkyl ethylene oxide ether sulfates containing about 1 to about 4 units of ethylene oxide per molecule and from about 10 to about 20 carbon atoms in the alkyl group.

Still another class of useful anionic surfactants include the water-soluble salts of esters of α-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and .beta.-alkyloxy alkane sulfonates containing from about 1 to 3 carbon atoms in the alkyl group and from about 8 to 20 carbon atoms in the alkane moiety.

A class of anionic surfactants advantageously employed are the alkyl sulfates and alkyl ether sulfates of the formula $$RO(C_2H_4O)xSO_3^- M^+$$

wherein R is an alkyl chain having from about 10 to about 22 carbon atoms, saturated or unsaturated, and the longest linear portion of the alkyl chain is 15 carbon atoms or less on the average, M is a cation capable of making the compound water-soluble, especially an alkali metal, ammonium or substituted ammonium cation, and x is from 0 to about 15. The anionic surfactant component of the present compositions comprises from about 5% to about 40%, in another embodiment from about 7% to about 36%, in still another embodiment from about 10% to about 25%, by weight of the detergent composition, of alkyl sulfates and/or alkyl ether sulfates as described above.

Other preferred anionic surfactants include, but are not limited to, non-ethoxylated C12-15 primary and secondary alkyl sulfates. Under cold water washing conditions, i.e., less than about 65° F., a mixture of such ethoxylated and non-ethoxylated alkyl sulfates is especially useful. Mixtures of the alkyl sulfates with the above-described paraffin sulfonates, alkyl glyceryl ether sulfonates and esters of α-sulfonated fatty acids, are also useful.

Another useful class of anionic surfactants are those known as alkyl benzene sulfonates. These include alkyl benzene sulfonates in which the alkyl group contains from about 9 to about 15 carbon atoms, in straight or branched chain configuration, e.g., those of the type described in U.S. Pat. Nos. 2,220,099 and 2,477,383, both of which are incorporated herein by reference.

Anionic surfactants advantageously employed in the invention are sold under the trade name Wtconate® AOS by AkzoNobel Surface Chemistry LLC, Chicago, Ill. The invention is not limited by choice of anionic surfactants and other known classes of anionic surfactants can also be usefully employed in the context of the invention.

Additional Components

As will be realized by those skilled in the art, an aqueous composition according to the present invention, suitable for surface, especially hard surface cleaning, may further comprise additional components, such as builders, co-builders, complexing agents, fillers, enzymes, pH regulators, hydrophilizing agents, perfumes, rheology modifiers and other ingredients typically used in cleaning formulations.

Builders/Complexing Agents

The builder can be an alkali carbonate or an alkali hydrogen carbonate, such as sodium carbonate, potassium carbonate, sodium hydrogen carbonate or potassium hydrogen carbonate, an alkali salt of a silicate, such as sodium silicate or sodium metasilicate, or alkali salts of phosphates, such as sodium orthophosphate. Alkaline builders which act through complexation are e.g. sodium pyrophosphate and sodium tripolyphosphate and the corresponding potassium salts. Examples of organic builders/complexing agents are aminocarboxylates, such as sodium nitrilotriacetate (Na₃NTA), sodium ethylenediaminetetraacetate (EDTA), sodium diethylenetriaminepentaacetate, sodium 1,3-propylenediaminetetraacetate and sodium hydroxyethylethylenediaminetriacetate; aminopolyphosphonates, such as nitrilotrimethylenephosphonate; organic phosphates; polycarboxylates, such as citrates; and alkali salts of gluconic acid, such as sodium or potassium gluconates.

Hydrophilizing Agents

The hydrophilizing agents are preferably selected from ethanol, n- or i-propanol, butanols, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or monoethyl ether, diisopropylene glycol monomethyl or monoethyl ether, methoxy, ethoxy or butoxytriglycol, 1-butoxyethoxy-2-propanol, 3-methyl-3-methoxybutanol, propylene glycol t-butyl ether, alcohols, more particularly $C_{1-4}$ alkanols, glycols, polyethylene glycols, preferably with a molecular weight of 100 to 100,000 and more particularly in the range from 200 to 10,000 and polyols, such as sorbitol and mannitol, and polyethylene glycol liquid at room temperature, carboxylic acid esters, polyvinyl alcohols, ethylene oxide/propylene oxide block copolymers and mixtures of the above.

pH Regulators

The pH regulators are preferably sodium carbonate, citric acid, sodium citrate, bicarbonate and/or alkali hydroxides, such a sodium and/or potassium hydroxide and chelates such as EDTA or GLDA sodium salts.

The preferred pH of the composition is alkaline. The preferred pH range is 10-12.

Additional Solvents

The composition of the present invention may comprise organic solvents, such as e.g. a lower ($C_1$-$C_6$) alcohol, such as ethanol or iso-propanol, or a glycol ether solvent such as glycol monobutyl ether. In one embodiment, the composition comprises at most 5, in another embodiment at most 2, and in still another embodiment at most 1 wt % of organic solvents. The composition of the present may also be free from, or essentially free from, i.e. containing no more than trace amounts of organic solvents.

Concentration in Composition

The composition of the invention may be provided in a ready-to-use formulation or may be provided as a concentrate to be diluted, typically in water, to the ready-to-use formulation. Further, the concentration in the ready-to-use formulation may be tailored to fit the purpose.

In a ready-to-use composition, the concentration of the primary non-ionic surfactant is generally in any amount from 0.05 wt % up to about 10 wt %, in a second embodiment 0.1 wt % up to 10 wt %, in another embodiment from 0.2 to 8 wt %, in a fourth embodiment from 0.3 to 5 wt %, in a fifth embodiment from 0.4, to 5 wt %, in a sixth embodiment 0.5 to 3, in a seventh embodiment 0.5 to 1.5, and in a eighth embodiment to 0.5 to 1 wt % based on the weight of the total composition.

The concentration of secondary surfactant in the ready-to-use composition is generally in any amount from 0.05 wt % up to about 10 wt %, in another embodiment 0.1 wt % up to 10 wt %, in another embodiment from 0.2 to 8 wt %, in a another embodiment from 0.3 to 5 wt %, in yet another embodiment from 0.4, to 5 wt %, in still another embodiment 0.5 to 3, in a seventh embodiment 0.5 to 1.5, and in an eighth embodiment to 0.5 to 1 wt % based on the weight of the total composition.

In the composition of the invention, the weight ratio of the primary non-ionic surfactant to secondary surfactant is in the range of from about 80:20 to about 20:80, in another embodiment from about 70:30 to about 30:70, and in a third embodiment from about 60:40 to about 40:60. In representative compositions, the weight ratio is about 50:50 on an as-is basis (for AG6206, an ideal ratio on an actives basis is ~60:40). For other secondary surfactants the optimum ratio may be different but 50:50 is a good starting point for formulation evaluation. There has to be enough of the secondary surfactant to make a clear solution, and this will depend on the specific combination used. On the other hand there must be enough of the primary surfactant to give the cleaning performance (if the ratio is skewed too much in favor of the secondary surfactant, the formulation will be low streaking but will not clean).

The concentration of inorganic based nanoparticles in the ready to use composition is generally in the range of from about 0.5 wt % up to 5 wt %, in another embodiment 0.5 wt % up to 4 wt %, in still another embodiment 0.5 wt % up to 3, and in yet another embodiment from 0.5 wt % up to 2 wt %.

The weight ratio of total surfactants to inorganic based nanoparticles is typically in the range of from about 80:20 to about 20:80, in another embodiment from about 70:30 to about 30:70 and in still another embodiment from about 60:40 to about 40:60. In representative compositions, the weight ratio is about 50:50.

The compositions of the present invention may be used as cleaning compositions for the cleaning of hard surfaces. Especially, and due to the low streak performance, the composition of the invention is suitable for cleaning of surfaces which, after cleaning, should have a shiny appearance, such as windows, mirrors, glossy wood, glossy tiles, granite, ceramic and others.

The invention will now be illustrated by the following nonlimiting examples.

Degreaser Evaluation procedure

Soil for Cleaning Testing is Prepared According to the Following Procedure. Residue is scraped out of a diesel locomotive engine. After the pistons are removed for refurbishing, there is a black, oily residue that remains in the engine block. This residue, for lack of better name, designated as train dirt, is removed and placed in a suitable container. Approximately 9 parts of train dirt are mixed with 1 part non detergent motor oil. This material is stored in a suitable container and used as the soil for cleaning testing.

Equipment:
1. 100 ml and 25 ml Pyrex beakers
2. Spectrophotometer or reflectometer (any instrument capable of accurately measuring changes in substrates reflectance, such as Minolta CM-508D spectrophotometer).
3. 1 inch paint brush
4. Sink with a water spray nozzle
5. 1×140×220 mm steel plates, which were primed, painted (white) plus two coats of lacquer, not unlike a car surface.

Procedure:
1. The panels are washed with detergent, then cleaned with IPA and allowed to dry before use.
2. The spectrophotometer is placed on the marked sections and a base reading is taken (marked as $\Delta L_B$, $\Delta a_B$ or $\Delta b_B$—the base reading).
3. The cleaning test soil is applied on to the test panel with a brush, then the soil is smoothed over the surface to obtain as even a coating as possible using a Kimwipe. The plates are then allowed to stand for at least 4 hours before testing.
4. The spectrophotometer is placed on the marked sections of the soiled panels and the soiled reading is taken (marked as $\Delta L_S$, $\Delta a_S$ or $\Delta b_S$—the soiled reading).
5. 100 mls of the test solutions are prepared and the solution is "diluted as required".
6. Twenty ml of each diluted test cleaner is poured onto the soiled plate (three solutions per plate). The control solution (Formulation D diluted 1:10, see below for composition), is applied in the fourth position on the plate.
7. The test solutions are left for twenty seconds. The plates are then cleaned using a low-pressure water spray. The plates are cleaned from the bottom up to remove the emulsified dirt.
8. The panels are allowed to air dry. The spectrophotometer is placed on the marked sections and the final reading is taken (marked as $\Delta L_C$, $\Delta a_C$ or $\Delta b_C$—the cleaned reading).
9. The Delta values are used to calculated the amount of soil removed from the panel using the C.I.E. Lab or L*a*b Color Space standard.

$$\Delta E_1 = \sqrt{(\Delta L_S - \Delta_B)^2 + (\Delta a_S - \Delta a_B)^2 + (\Delta b_S - \Delta b_B)^2}$$

$$\Delta E_2 = \sqrt{(\Delta L_C - \Delta_B)^2 + (\Delta a_C - \Delta a_B)^2 + (\Delta b_C - \Delta b_B)^2}$$

$\Delta E_1$ is the color difference between the base reading and soiled reading. $\Delta E_2$ is the color difference between the base reading and the cleaned reading.

10. Percentage of soil removal is calculated as the difference between $\Delta E_2$ and $\Delta E_1$ as shown below:

$$\text{Soil Removal}(\%) = ((\Delta E_1 - E_2)/\Delta E_1) \times 100$$

11. Each test formulation is repeated three times and the standard deviation calculated. However, if the standard deviation of a single test is greater than 15%, the formulation is re-tested and any outlying points eliminated. In some cases the repeated studies show no outlying points and both data sets are combined. The control solution should give 95±7% soil removal.

In some cases, subjective ratings were given to the cleaning performance rather than quantify with a spectrophotometer. The procedure as outlined above was followed up to and including step 7. At this point the panels were visually inspected and a rating given to estimate the cleaning performance. An explanation of the ratings is given below. In all cases the cleaning performance is approximated.
None=no visible zero soil removal
Poor=~0-25% soil removal
Fair=~25-50% soil removal
Good=~50-75% soil removal
Excellent=~75% 100% soil removal
Streaking Performance
1. Prepare a clean 15 cm'×15 cm glass mirror tile (thoroughly washed with hand dish wash detergent solution, followed by deionized water, followed by wiping with ethanol and allowing to dry) and lay it flat on the bench.
2. Fold a sheet of Bounty® paper towel in half four times and attach a binder clip to the top edge to use as a handle.
3. Using a micropipette, apply 200 µl of the test solution in a thin line just inside the top edge of the tile in the center (the aim is eventually to cover the center third of the tile with a stripe of the solution).
4. With the paper towel, wipe the solution over the tile for three cycles (one time towards and one time away from the operator is one cycle).
5. Pick up the tile and watch how the strip of solution dries (fast, slow, evenly, from the edges in, etc.). When it is fully dry, assess how streaky it is on a scale of 0-4, where 0 is essentially no streaks (e.g. Windex Original) and Formulation D* diluted 1:10 gives a 4 (very bad streaking).

*9% Berol® 226 SA, 9% Ethylene Diamine tetraacetic acid EDTA (40%), 4% TKPP (tetrapotassium pyrophosphate) made up to 100% with water, which is diluted 1 part solution to 9 parts water (i.e. 1:10) before testing. This is our lab standard high efficiency degreaser.

Compositions tested for cleaning and streaking performance are reported in Tables 2 and 3. The percentages reported in the table are for the product as is and are not corrected for the presence of solvents and or diluents.

In table 1 all of the reported comparative examples are formulations containing 1% Dissolvine® 100-S as the "builders". All of the formulations reported in Table 2 contain only two additional ingredients beside the builders. It is apparent on looking at the results that out of these numerous examples tested there was not a combination that produced low streaking and excellent cleaning. In this case the lower the streaking the better, so a score of 0 would be the most preferred. In fact in most cases the relationship of cleaning to streaking is inverted. Thus excellent cleaning tended to be accompanied by streaking scores of higher than 2 and in most cases a 3 or 4 in streaking was observed. Also evident is that those formulations with the best streaking tended to clean poorly. Those formulations that scored a 0 or 1 on streaking, cleaned poorly or in one case, example AB, showed fair cleaning.

This table illustrates the difficulty in preparing a low streaking excellent cleaning formulation without using the subject of this invention. Despite not meeting the cleaning and streaking targets information derived from this table was important in understanding the problem of streaking.

Compare the results for examples A to F. In this case we are looking at the performance of surfactant 4 having a CPP≤0.85. It is evident that the cleaning performance of this product is excellent but the streaking is very poor. Compare this to the results for examples G to P. These examples show the effect of increasing the concentration of Bindzil® CC30 in a formulation. It is apparent that Bindzil® CC30 is inherently low in streaking by nature. Concentrations up to 4% were very low in streaking. At higher concentration levels however, streaking becomes more apparent. It is also clear that in this test the Bindzil® CC30 performed very poorly as a cleaner. Comparative examples Q to Y show the performance of surfactant 6 having a CPP≤0.85. It is evident that the over all streaking performance is much better than compared to surfactant 4 (examples A to F). It is also evident that secondary surfactants can show very poor detergency even at high concentrations.

Addition of Bindzil® CC30 to surfactants improves the streaking. Compare example B to AC. A formulation containing 0.5% of surfactant 4 had a poor streaking score of 4. In example AC, 0.5% Bindzil® CC30 added to surfactant 4 improved the streaking score from a 4 to a 2. Similar comparative examples can be made showing that at the same surfactant concentration, addition of Bindzil® CC30 improved the streaking score. It should be noted that although streaking can be improved by the addition of a nanoparticle, it cannot be brought to the ideal score of 0 or even less preferred a streaking score of 1.

Examples BE to BI show the results for compositions containing two surfactants and no nanoparticles. It is evident from these results that both the performance attributes of low streaking and excellent cleaning cannot be met by the combination of two ingredients.

Table 3 contains comparative examples on more complex formulations that demonstrate the elements of the present invention. It is clear on examining the results in Table 2 that a low streaking and excellent cleaning formulations requires a minimum of three ingredients.

Comparative example CA contains no primary surfactant so the cleaning performance is poor. Addition of a small amount of detersive surfactant to example CA resulted in a formulation CB that shows both low streaking and excellent cleaning. Formulation CC also had good cleaning and low streaking. It is clear from example CD that the balance of the three components is critical to obtain the desired performance. Compare example CD to CC. The difference is a small amount of detersive surfactant yet the impact on streaking performance is critical. Numerous examples exist in the attached table showing that the presence of the three components is important as is the ratio of the three components.

TABLE 2

Comparative Examples Containing Two Components.

1% Dissolvine 100-S

| Ingredient Comparative Example | Surfactant 4 CPP = 0.72 wt % | Nanoparticle wt % Bindzil CC30 | Surfactant 6 CPP = 0.63 wt % | Streaking | Cleaning |
|---|---|---|---|---|---|
| A | 0.25 | 0.00 | 0.00 | 4 | Excellent |
| B | 0.50 | 0.00 | 0.00 | 4 | Excellent |
| C | 1.00 | 0.00 | 0.00 | 4 | Excellent |
| D | 2.00 | 0.00 | 0.00 | 4 | Excellent |
| E | 3.00 | 0.00 | 0.00 | 4 | Excellent |
| F | 4.00 | 0.00 | 0.00 | 4 | Excellent |
| G | 0.00 | 0.25 | 0.00 | 0 | Poor |
| H | 0.00 | 0.50 | 0.00 | 0 | Poor |
| I | 0.00 | 1.00 | 0.00 | 0 | Poor |
| J | 0.00 | 2.00 | 0.00 | 0 | Poor |
| K | 0.00 | 3.00 | 0.00 | 0 | Poor |
| L | 0.00 | 4.00 | 0.00 | 0 | Poor |
| M | 0.00 | 5.00 | 0.00 | 1 | Poor |
| N | 0.00 | 7.00 | 0.00 | 2 | Poor |

TABLE 2-continued

Comparative Examples Containing Two Components.
1% Dissolvine 100-S

| Ingredient Comparative Example | Surfactant 4 CPP = 0.72 wt % | Nanoparticle wt % Bindzil CC30 | Surfactant 6 CPP = 0.63 wt % | Streaking | Cleaning |
|---|---|---|---|---|---|
| O | 0.00 | 10.00 | 0.00 | 3 | Poor |
| P | 0.00 | 12.00 | 0.00 | 4 | Poor |
| Q | 0.00 | 0.00 | 1.00 | 0 | Poor |
| R | 0.00 | 0.00 | 2.00 | 0 | Poor |
| S | 0.00 | 0.00 | 3.00 | 1 | Poor |
| T | 0.00 | 0.00 | 4.00 | 1 | Poor |
| U | 0.00 | 0.00 | 5.00 | 2 | Poor |
| V | 0.00 | 0.00 | 7.00 | 2 | Poor |
| W | 0.00 | 0.00 | 10.00 | 2 | Poor |
| Y | 0.00 | 0.00 | 12.00 | 2 | Poor |
| Z | 0.13 | 0.13 | 0.00 | 2 | Excellent |
| AA | 0.25 | 0.25 | 0.00 | 3 | Excellent |
| AB | 0.25 | 2.75 | 0.00 | 0 | Fair |
| AC | 0.50 | 0.50 | 0.00 | 2 | Excellent |
| AD | 0.50 | 2.50 | 0.00 | 1 | Excellent |
| AE | 0.75 | 2.25 | 0.00 | 2 | Excellent |
| AF | 1.00 | 1.00 | 0.00 | 2 | Excellent |
| AG | 1.00 | 2.00 | 0.00 | 2 | Excellent |
| AH | 1.25 | 1.75 | 0.00 | 2 | Excellent |
| AI | 1.50 | 1.50 | 0.00 | 2 | Excellent |
| AJ | 1.75 | 1.25 | 0.00 | 3 | Excellent |
| AK | 2.00 | 1.00 | 0.00 | 3 | Excellent |
| AL | 2.00 | 2.00 | 0.00 | 1 | Excellent |
| AM | 2.25 | 0.75 | 0.00 | 4 | Excellent |
| AN | 2.50 | 2.50 | 0.00 | 1 | Excellent |
| AO | 2.50 | 0.50 | 0.00 | 4 | Excellent |
| AP | 2.75 | 0.25 | 0.00 | 4 | Excellent |
| AQ | 3.50 | 3.50 | 0.00 | 2 | Excellent |
| AR | 5.00 | 5.00 | 0.00 | 2 | Excellent |
| AS | 0.00 | 0.50 | 0.50 | 1 | Poor |
| AT | 0.00 | 0.50 | 2.50 | 0 | Poor |
| AU | 0.00 | 1.00 | 1.00 | 1 | Poor |
| AV | 0.00 | 1.00 | 2.00 | 0 | Poor |
| AW | 0.00 | 1.50 | 1.50 | 1 | Poor |
| AX | 0.00 | 2.00 | 1.00 | 0 | Poor |
| AY | 0.00 | 2.00 | 2.00 | 1 | Poor |
| AZ | 0.00 | 2.50 | 2.50 | 1 | Poor |
| BA | 0.00 | 2.50 | 0.50 | 0 | Poor |
| BB | 0.00 | 3.50 | 3.50 | 1 | Poor |
| BC | 0.00 | 5.00 | 5.00 | 1 | Poor |
| BD | 0.00 | 6.00 | 6.00 | 2 | Poor |
| BE | 1.00 | 0.00 | 1.00 | 3 | Excellent |
| BF | 1.50 | 0.00 | 1.50 | 3 | Excellent |
| BG | 2.00 | 0.00 | 2.00 | 3 | Excellent |
| BH | 2.50 | 0.00 | 2.50 | 4 | Excellent |
| BI | 3.00 | 0.00 | 3.00 | 4 | Excellent |

TABLE 3

Comparative Examples Containing Multiple Components.
1. 1% Dissolvine 100-S, balamce water
2. 0.9% Dissolvine 100-S, 0.4% TKPP balance water

| | Ingredient | | | | | | | |
|---|---|---|---|---|---|---|---|---|
| | Detersive Surfactant | | | Nanoparticle | | Secondary Surfactant | | |
| Comparative Example | Surfactant 1 CPP = 0.96 | Surfactant 3 CPP = 1.16 | Surfactant 2 CPP = 1.02 | Bindzil CC301 | Bindzil CC30 | Surfactant 6 CPP = 0.63 | Surfactant 10 CPP = 0.65 | Surfactant 11 CPP = 0.54 |
| CA | 0.00 | | | | 2.00 | 1.00 | | |
| CB | 0.33 | | | | 2.00 | 0.66 | | |
| CC | 0.50 | | | | 2.00 | 0.50 | | |
| CD | 0.66 | | | | 2.00 | 0.33 | | |
| CE | 1.00 | | | | 2.00 | | | |
| CF | 0.50 | | | | 2.00 | | | |
| CG | 0.33 | | | | 2.00 | | 0.66 | |
| CH | 0.50 | | | | 2.00 | | 0.50 | |
| CI | 0.66 | | | | 2.00 | | 0.33 | |
| CJ | | | | | 2.00 | | | 1.00 |
| CK | 0.33 | | | | 2.00 | | | 0.66 |
| CL | 0.50 | | | | 2.00 | | | 0.50 |
| CM | 0.66 | | | | 2.00 | | | 0.33 |
| CN | | | | | 2.00 | | | 0.66 |
| CO | | | | | 2.00 | | | 0.50 |
| CP | | | | | 2.00 | | | 0.33 |
| CQ | | | | | 2.00 | 3.00 | | |
| CR | | | | | 2.00 | 1.50 | | |
| CS | | | | | 2.00 | | | |
| CT | | | | | 0.50 | 2.00 | | |
| CU | | | | | 0.50 | 0.50 | | |
| CV | | | | | 1.00 | 1.00 | | |
| CW | | | | | 1.50 | 1.50 | | |
| CX | | | | | 1.50 | | | |
| CY | | | | | 2.00 | 0.50 | | |
| CZ | | | | | 3.00 | | | |
| DA | | | 0.44 | | | | | |
| DB | | | 0.44 | | | 1.00 | | |
| DC | | | 0.44 | | | 2.00 | | |
| DD | | | 0.44 | | | 3.00 | | |
| DE | | | 0.44 | | | 5.00 | | |

TABLE 3-continued

Comparative Examples Containing Multiple Components.
1. 1% Dissolvine 100-S, balamce water
2. 0.9% Dissolvine 100-S, 0.4% TKPP balance water

| | | | | | | |
|---|---|---|---|---|---|---|
| DF | | | 0.44 | | | |
| DG | | | 0.44 | 1.00 | | |
| DH | | | 0.44 | 2.00 | | |
| DI | | | 0.44 | 3.00 | | |
| DJ | | | 0.44 | 2.00 | | |
| DK | | | 0.44 | 2.00 | | |
| DL | | | 0.44 | 2.00 | | |
| DM | | | 0.44 | 2.00 | | |
| DN | 0.50 | | | 2.00 | | 0.50 |
| DO | | 0.24 | | | | 0.50 |
| DP | | 0.24 | | | 2.00 | 0.50 |
| DQ | | 0.24 | | | 2.00 | 0.50 |
| DR | 0.30 | | | | 2.00 | 0.50 |

| | Ingredient | | | | | | |
|---|---|---|---|---|---|---|---|
| | Secondary Surfactant | | Other | | | | |
| Comparative Example | Surfactant 12 CPP = 0.32 | Surfactant 4 CPP = 0.72 | SXS | Witconate AOS | Builders | Streaking | Cleaning |
| CA | | | | | 1 | 0 | None |
| CB | | | | | 1 | 0 | Excellent |
| CC | | | | | 1 | 0 | Excellent |
| CD | | | | | 1 | 2 | Excellent |
| CE | | | | | 1 | 4 | Excellent |
| CF | | | 0.50 | | 1 | 3 | Excellent |
| CG | | | | | 1 | <1 | 94.30% |
| CH | | | | | 1 | <1 | 96.30% |
| CI | | | | | 1 | 2 | 93.70% |
| CJ | | | | | 1 | 0 | None |
| CK | | | | | 1 | 0 | Fair |
| CL | | | | | 1 | 0 | Excellent |
| CM | | | | | 1 | 2 | Excellent |
| CN | | 0.33 | | | 1 | 0 | Fair |
| CO | | 0.50 | | | 1 | 0 | Fair |
| CP | | 0.66 | | | 1 | 2 | Fair |
| CQ | | | | | 1 | 2 | 6.10% |
| CR | | 1.50 | | | 1 | 2 | 90.70% |
| CS | | 3.00 | | | 1 | 4 | 89.10% |
| CT | | 0.50 | | | 1 | 1 | 75.20% |
| CU | | 2.00 | | | 1 | 3 | 90.10% |
| CV | | 1.00 | | | 1 | 1 | 85% |
| CW | | | | | 1 | 0 | 17.10% |
| CX | | 1.50 | | | 1 | 2 | 78.8 |
| CY | | 0.50 | | | 1 | 0 | 76% |
| CZ | | | | | 1 | 0 | 17.90% |
| DA | 0.32 | | | | 2 | 4 | ND |
| DB | 0.32 | | | | 2 | 4 | ND |
| DC | 0.32 | | | | 2 | 4 | ND |
| DD | 0.32 | | | | 2 | 3 | ND |
| DE | 0.32 | | | | 2 | 3 | ND |
| DF | 0.32 | | | 0.90 | 2 | 4 | 77.60% |
| DG | 0.32 | | | 0.90 | 2 | 1 | 57.90% |
| DH | 0.32 | | | 0.90 | 2 | 0 | 68.20% |
| DI | 0.32 | | | 0.90 | 2 | 0 | 69.60% |
| DJ | 0.32 | | | 0.50 | 2 | 1 | ND |
| DK | 0.32 | | | 0.30 | 2 | 2 | ND |
| DL | 0.32 | | | 0.10 | 2 | 3 | ND |
| DM | 0.32 | | | | 1 | 4 | ND |
| DN | | | | | 1 | 0 | Excellent |
| DO | | 0.16 | | | 2 | 3 | Excellent |
| DP | | 0.16 | | | 2 | 0 | Excellent |
| DQ | | 0.16 | | 0.90 | 2 | 0 | Fair |
| DR | | 0.20 | | | 1 | 0 | Excellent |

The data show the improved performance of the compositions of the invention compared to prior art compositions.

Critical Packing Parameter

The CPP is defined as follows:

$$cpp = \frac{v_{tail}}{l_{tail} a_0}$$

where $v_{tail}$ is the volume of the hydrophobic tail, $l_{tail}$ the length of the hydrophobic tail and $a_o$ is the area of the head group.

To determine the shape of a single surfactant, it was modelled using the molecular modelling module Discover® in Materials Studio (Materials Studio v4.3.0.0. Copyright 2008, Accelrys Software Inc.). The surfactant is modelled by defining the atoms and assuming a harmonic potential for the bonds using the pcff forcefield. This forcefield was developed based on CFF91. More details on this type of modelling can be found in the work by Allen and Tildesley ([1] M. P. Allen; D. J. Tildesley. *Computer Simulation of Liquids*, Oxford University Press (1987)).

Discover® was used to find a (local) energy minimum of the surfactant molecular structure, the starting point for the minimization was an extended conformation of the tail. After minimisation, the three necessary parameters to calculate a CPP can be determined: $v_{tail}$ (volume of the hydrophobic tail), $l_{tail}$ (the length of the hydrophobic tail) and $a_o$ (the area of the head group). For those materials that are not a pure chemical substance a CPP was calculated for each major homologue of the series and the CPP estimated based on the mole fraction of the component.

TABLE 4

Summary of CPP calculations.

| Surfactant | area a_0 | volume v_0 | length l_0, corr | cpp_corr | wt % | Contribution |
|---|---|---|---|---|---|---|
| Surfactant 1 | | | | | | |
| C9E5 | 41.6 | 554 | 13.6 | 0.98 | 9 | 8.81 |
| C9E6 | 43.8 | 554 | 13.6 | 0.93 | 9 | 8.38 |
| C10E5 | 41.2 | 599 | 14.7 | 0.99 | 21 | 20.77 |
| C10E6 | 43.2 | 608 | 14.9 | 0.95 | 21 | 19.85 |
| C11E5 | 41.9 | 634 | 16.0 | 0.94 | 19 | 17.95 |
| C11E6 | 42.4 | 649 | 16.1 | 0.95 | 19 | 18.03 |
| | | | | | cpp_avg: composition | 0.96 corr |
| Surfactant 2 | | | | | | |
| C9E4 | 39.6 | 551 | 13.7 | 1.01 | 18 | 18.26 |
| C10E4 | 39.6 | 604 | 15.0 | 1.02 | 42 | 42.73 |
| C11E4 | 39.6 | 660 | 16.2 | 1.03 | 38 | 39.06 |
| | | | | | cpp_avg: | 1.02 |
| Surfactant 3 | | | | | | |
| 2-propyl heptanol E5 | 41.1 | 527 | 11.0 | 1.16 | | |
| Surfactant 4 | | | | | | |
| C10(PO)2(EO)8 | 55.7 | 599 | 14.9 | 0.72 | 85 | 61.36 |
| C12(PO)2(EO)8 | 55.9 | 707 | 17.5 | 0.72 | 15 | 10.85 |
| | | | | | cpp_avg: | 0.72 |
| Surfactant 5 | | | | | | |
| 2-propyl heptanol E8 | 44.9 | 585 | 11.2 | 1.16 | | |
| Surfactant 6 | | | | | | |
| C6Gluc | 61.9 | 383 | 9.0 | 0.69 | 50 | 34.31 |
| C6Gluc2 | 72.3 | 380 | 9.1 | 0.58 | 50 | 28.85 |
| | | | | | cpp_avg: | 0.63 |
| Surfactant 7 | | | | | | |
| C10Gluc | 61.9 | 600 | 13.9 | 0.70 | 25 | 17.44 |
| C10Gluc2 | 72.5 | 597 | 14.1 | 0.58 | 25 | 14.60 |
| 2-ethylhexylGluc | 42.0 | 323 | 8.9 | 0.86 | 25 | 21.60 |
| 2-ethylhexylGluc2 | 72.6 | 471 | 8.8 | 0.74 | 25 | 18.43 |
| | | | | | cpp_avg: | 0.72 |
| Surfactant 8 | | | | | | |
| 2-ethylhexylGluc | 42.0 | 323 | 8.9 | 0.86 | 50 | 43.20 |
| 2-ethylhexylGluc2 | 72.6 | 471 | 8.8 | 0.74 | 50 | 36.87 |
| | | | | | cpp_avg: | 0.80 |
| Surfactant 9 | | | | | | |
| C12NC2O | 63.3 | 702 | 17.7 | 0.63 | 20 | 12.53 |
| C14NC2O | 63.1 | 810 | 20.3 | 0.63 | 50 | 31.60 |
| | | | | | cpp_avg: | 0.63 |

TABLE 4-continued

Summary of CPP calculations.

| Surfactant | area a_0 | volume v_0 | length l_0, corr | cpp_corr | | |
|---|---|---|---|---|---|---|
| Surfactant 10 | | | | | | |
| C12N(C2OH)2O | 61.7 | 695 | 17.5 | 0.64 | 20 | 12.88 |
| C14N(C2OH)2O | 61.7 | 804 | 20.1 | 0.65 | 50 | 32.43 |
| | | | | cpp_avg: | | 0.65 |
| Surfactant 11 | | | | | | |
| C8N(CH2CH2COOH)2 | 71.9 | 485 | 12.5 | 0.54 | | |
| Surfactant 12 | | | | | | |
| C12N(C)(E5)(E10) | 122.8 | 694 | 14.5 | 0.39 | 50 | 19.48 |
| C12N(C)(E7)(E8) | 206.7 | 760 | 14.3 | 0.26 | 50 | 12.85 |
| | | | | cpp_avg: | | 0.32 |

We claim:

1. A cleaning composition comprising:
   a) a primary detergent component which comprises at least one non-ionic surfactant having a critical packing parameter of ≥0.95,
   b) silanized colloidal silica particles wherein at least about 40 wt % of the colloidal silica particles are silanized, and
   c) a secondary surfactant having a critical packing parameter of <0.85, wherein said primary detergent component is an alkoxylate surfactant having the formula $$R_1O\text{-}(AO)_n \quad (1),$$

and wherein $R_1$ is linear or branched, saturated or unsaturated hydrocarbyl group containing from 8 to 18 carbon atoms, AO is an alkyleneoxy group, and n is an integer from 1 to 25; and wherein said secondary surfactant is selected from I.) an alkyl (poly)glucoside having the formula $$R^2OG_p$$

where, $R^2$ is a straight or branched, saturated or unsaturated hydrocarbyl group, containing from 6 to 12 carbon atoms, G is a monosaccharide residue;

p is a real number from 1 to 5;

II.) an amine oxide of the structure $$R\text{—}N^+(R1)(R2)\text{-}O^-$$

wherein R is a alkyl group containing 10-18 carbons optionally containing an amide or ester linkage, R1 and R2 can be the same or different and are selected from the group consisting of, methyl, ethyl, hydroxyl ethyl, 2-hydroxy propyl;

III.) a cationic surfactants is of the formula $$\begin{array}{c} R^2 \\ | \\ R\text{—}N^+\text{—}(CH_2CH_2O)_n\text{—}H \quad X^- \\ | \\ R^1 \end{array} \quad (3)$$

where R=$C_6$-$C_{22}$ hydrocarbyl, $R^1$ and $R^2$ are independently $C_1$-$C_4$ alkyl, n is at least 12, and $X^-$ is an anion;

IV.) a surfactant of the formula $$\begin{array}{c} R1 \\ | \\ R\text{—}N^+\text{—}(CH_2CH_2O)n\text{-}H \quad X^- \\ | \\ (CH_2CH_2O)n\text{-}H \end{array}$$

where R=$C_6$-$C_{22}$ hydrocarbyl, $R^1$ is independently $C_1$-$C_4$ alkyl, n is an integer of from 12 to 17; and X is an anion;

V.) an amphoteric secondary surfactant of the formula $$R\text{—}N\begin{array}{c} (CH_2)nCO_2H \\ \diagdown \\ (CH_2)nCO_2H \end{array}$$

where R=$C_6$-$C_{22}$ hydrocarbyl having 6 to 22 carbon atoms, n is an integer of from 1 to 4

VI.) a nonionic surfactant comprising a $C_{10-14}$ alcohol with 0-2 PO and 6-10 EO and combinations and mixtures thereof.

2. The composition of claim 1 wherein $(AO)_n$ is $(PO)_a(EO)_b(PO)_c$, where PO is a propyleneoxy unit, EO is an ethyleneoxy unit, a+b+c=n and a=0-5, b=1-20, and c=0-5.

3. The composition of claim 1 wherein said primary detergent component is selected from $C_8$-$C_{10}$ alcohol+4, 5, or 6 moles of EO, $C_{10}$ alcohol plus 4, 5, or 6 moles of EO, $C_9$-$C_{11}$ alcohol+4, 5 or 6 moles of EO, $C_{11}$ alcohol+3, 4, 5, 6, 7 or 8 moles of EO, tridecyl alcohol+4, 5, 6, 7 or 8 moles of EO, and, 2-ethylhexanol+3, 4 or 5 moles of EO, 2-ethylhexanol+2 moles of PO+4, 5 or 6 moles of EO, 2-propylheptanol+3, 4, 5 or 6 moles of EO and 2-propylheptanol+1 mole of PO+4 moles of EO, 2-butyloctanol+5, 6 or 7 moles of EO, and combinations or mixtures thereof.

4. The composition of claim 1 wherein the silica content in the sol is from about 20 to about 80 wt %, the pH of the silica sol from about 1 to about 13, and the silica sol has an S-value from about 20 to about 100.

5. The composition of claim 1 wherein said secondary surfactant comprises

I.) an alkyl (poly)glucoside having the formula $$R^2OG_p$$

where, $R^2$ is a straight or branched, saturated or unsaturated hydrocarbyl group, containing from 6 to 12 carbon atoms, G is a monosaccharide residue;

p is a real number from 1 to 5, wherein said composition additionally comprises a $C_{10-14}$ alcohol with 0-2 PO and 6-10 EO.

6. A ready to use cleaning formulation comprising an effective amount of the composition of claim 1 wherein, the concentration of the primary non-ionic surfactant from about 0.05 to 1.5 wt % based on the weight of the total composition, the concentration of the secondary surfactant from about 0.05 to 1.5 wt % based on the weight of the total composition and the weight ratio of the primary non-ionic surfactant to secondary surfactant is in the range of from about 70:30 to about 30:70.

7. The formulation of claim 6 wherein the concentration of silanized colloidal silica particles in the ready to use composition is up to about 5 wt %.

8. A hard surface cleaning composition comprising:
a) a primary detergent component which comprises at least one non-ionic alcohol alkoxylate surfactant having a critical packing parameter of >0.95 having the formula $$R_1O\text{-}(AO)_n \qquad (1)$$

where $R_1$ is linear or branched, saturated or unsaturated alkyl group, containing from 8 to 12 carbon atoms, AO is an alkyleneoxy group, and n is a real number from 2 to 10, b) silanized colloidal silica particles wherein at least about 40 wt % of the colloidal silica particles are silanized, and
c) a secondary surfactant having a critical packing parameter of ≤0.85, wherein said secondary surfactant is an alkyl (poly)glucoside having the formula $$R^2OG_p$$

where, $R^2$ is a straight or branched, saturated or unsaturated alkyl group containing from 6 to 10, carbon atoms, G is glucoside; and p is a real number from 1 to 3.

9. The hard surface cleaning composition of claim 8 additionally comprising a second secondary surfactant comprising a $C_{10-14}$ alcohol with 0-2 PO and 6-10 EO.

10. The hard surface cleaning composition of claim 9 wherein the weight ratio of said primary non-ionic surfactant to the total amount of secondary surfactant present is in the range of from about 70:30 to about 30:70.

11. The composition of claim 1 wherein the alkyleneoxy group is an ethyleneoxy, propyleneoxy, or butyleneoxy group, or a mixture of two or more thereof in any order.

12. The composition of claim 8 wherein the alkyleneoxy group is an ethyleneoxy, propyleneoxy, or butyleneoxy group, or a mixture of two or more thereof in any order.

* * * * *